(12) United States Patent
Jung (10) Patent No.: US 8,672,330 B2
(45) Date of Patent: Mar. 18, 2014

(54) SEALING ARRANGEMENT

(76) Inventor: Alfred Jung, Cologne (DE)

(*) Notice: Subject to any disclaimer, the term of this patent is extended or adjusted under 35 U.S.C. 154(b) by 6548 days.

(21) Appl. No.: 11/922,834

(22) PCT Filed: Jan. 16, 2007

(86) PCT No.: PCT/EP2007/050400
§ 371 (c)(1),
(2), (4) Date: Dec. 21, 2007

(87) PCT Pub. No.: WO2007/082887
PCT Pub. Date: Jul. 26, 2007

(65) Prior Publication Data
US 2009/0033041 A1 Feb. 5, 2009

(30) Foreign Application Priority Data

Jan. 17, 2006 (DE) .................... 20 2006 000 726 U
Jan. 26, 2006 (DE) .................... 20 2006 001 224 U
Feb. 8, 2006 (DE) ....................... 10 2006 005 660
Aug. 28, 2006 (WO) ................. PCT/EP2006/065747

(51) Int. Cl.
*F16L 17/06* (2006.01)

(52) U.S. Cl.
USPC ........... 277/592; 277/593; 277/595; 277/626; 277/630

(58) Field of Classification Search
USPC ..................... 277/592–598, 610, 633, 626
See application file for complete search history.

(56) References Cited

U.S. PATENT DOCUMENTS

| 843,394 | A | | 2/1907 | Haynes |
| 854,135 | A | * | 5/1907 | Whittemore .................. 428/175 |
| 922,130 | A | * | 5/1909 | Goetze .......................... 277/612 |
| 1,030,055 | A | | 6/1912 | Darlington, Jr. |

(Continued)

FOREIGN PATENT DOCUMENTS

| DE | 25 01 000 | 7/1976 |
| DE | 28 41 812 | 4/1979 |

(Continued)

OTHER PUBLICATIONS

"Garlock, Metall-Weichstoff Flachdichtungen", Apr. 2006.
"Profil-Übersicht", Kempchen, 1993.
English Translation (39 pages) of Tietze, Wolfgang and Alexander Riedl (Eds.), "Taschenbuch Dichtungstechnik" (Pocket Book Seals and Gaskets), 2nd Edition, Vulkan-Verlag GmbH, Essen, 2005, Chapter 3, pp. 51-96.
Dubbel, "Taschenbuch für den Maschinenbau," Springer-Verlag, Berlin 1990, pp. K11 and K18.

(Continued)

*Primary Examiner* — Shane Bomar
*Assistant Examiner* — Robert E Fuller
(74) *Attorney, Agent, or Firm* — Collard & Roe, P.C.

(57) ABSTRACT

A sealing arrangement, which is particularly suitable for flat flange connections, has an annular, metallic base body (1). Connected to the metallic base body (1) at both sides are soft material supports (2). The base body (1) has ring teeth (3,4) which run around radially at the inside and/or at the outside. The ring teeth (3,4), in the installed state, permit punctiform metallic contact and also have a spring characteristic. The spring characteristic of the ring teeth (3,4) is selected such that, in a first embodiment, after the removal of the seal from the flanges, the tooth height corresponds substantially to the height before the installation. The region of the base body (1) which is covered by the soft material supports (2) also has angular ring teeth (5). The ring teeth (5) have a spring characteristic, wherein after the removal of the seal, the ring teeth (5) spring back to at least 75% of the original state. In a further embodiment, the ring teeth (5) which are covered by the soft material support (2) are partially plastically deformable.

50 Claims, 4 Drawing Sheets

(56) References Cited

U.S. PATENT DOCUMENTS

| | | | |
|---|---|---|---|
| 1,100,182 | A | 6/1914 | Hettinger |
| 2,011,563 | A * | 8/1935 | Balfe ........................ 29/432 |
| 2,350,404 | A | 6/1944 | Liston |
| 2,352,290 | A | 6/1944 | Saul et al. |
| 2,353,623 | A | 7/1944 | Saul |
| 2,393,795 | A | 1/1946 | Miller |
| 2,444,097 | A | 6/1948 | Grant |
| 2,465,177 | A | 3/1949 | Shaffer |
| 2,854,740 | A | 10/1958 | Riggs et al. |
| 3,107,419 | A | 10/1963 | Sandifer |
| 4,485,138 | A | 11/1984 | Yamamoto et al. |
| 4,795,174 | A | 1/1989 | Whitlow |
| 5,129,136 | A | 7/1992 | Richardson |
| D348,810 | S | 7/1994 | Johnson |
| 5,421,594 | A | 6/1995 | Becerra |
| 5,639,100 | A | 6/1997 | Garrigues et al. |
| 5,785,322 | A | 7/1998 | Suggs et al. |
| 6,092,811 | A | 7/2000 | Bojarczuk et al. |
| 6,354,600 | B1 | 3/2002 | Jung |
| 6,367,803 | B1 | 4/2002 | Loth |
| 6,457,726 | B1 | 10/2002 | Jung |
| 6,845,983 | B1 | 1/2005 | Suggs et al. |
| 6,994,353 | B2 * | 2/2006 | Kinoshita ................ 277/592 |
| 7,000,924 | B2 | 2/2006 | Höhe et al. |
| 7,252,902 | B2 | 8/2007 | Bram et al. |
| 7,455,301 | B2 * | 11/2008 | Ragsdale et al. ........... 277/627 |
| 2004/0160017 | A1 | 8/2004 | Diez et al. |
| 2005/0116427 | A1 * | 6/2005 | Seidel et al. ............. 277/610 |
| 2006/0145428 | A1 | 7/2006 | Dudman |
| 2006/0181032 | A1 | 8/2006 | Riggs et al. |

FOREIGN PATENT DOCUMENTS

| | | |
|---|---|---|
| DE | 28 28 475 | 1/1980 |
| DE | 87 04 943 | 5/1987 |
| DE | 36 33 335 | 4/1988 |
| DE | 36 39 160 | 5/1988 |
| DE | 37 20 224 | 1/1989 |
| DE | 89 14 536 | 2/1990 |
| DE | 287 177 | 2/1991 |
| DE | 41 39 453 | 6/1992 |
| DE | 41 04 790 | 8/1992 |
| DE | 299 09 270 | 9/1999 |
| DE | 100 11 646 | 9/2001 |
| DE | 201 12 799 | 11/2001 |
| DE | 201 21 984 | 1/2004 |
| EP | 0 268 134 | 5/1988 |
| EP | 0 939 263 | 9/1999 |
| EP | 1 062 442 | 12/2000 |
| EP | 1136734 A1 * | 9/2001 |
| EP | 1 677 033 | 7/2006 |
| FR | 396 914 | 4/1909 |
| FR | 2 441 111 | 6/1980 |
| GB | 2 229 047 | 9/1990 |
| KR | 2001019600 | 3/2001 |
| SU | 1 516 700 | 10/1989 |
| WO | WO 94/16247 | 7/1994 |
| WO | WO 97/49939 | 12/1997 |
| WO | WO 99/45298 | 9/1999 |
| WO | WO 03/032420 | 4/2003 |

OTHER PUBLICATIONS

Allgemeine Masstabellen für Flachdichtungen nach DIN, DIN EN and ASME.-kempchen & Co. GmbH, pp. 1-10, (no publication date indicated).

Hahn et al., "Metalltechnik," Seventh Edition, published in 2002, pp. 203/204.

Product Catalog, "Dichtungssysteme zur Steigerung der Wettbewerbsfähigkeit—Jungtec ECO plus die neue TA-Luft-Flachdichtung," by JUNGTEC GmbH & Co. KG, published in 2005.

German Search Report dated Oct. 6, 2009 along with an English translation of the relevant parts.

Pictures of a prior art wave ring sealing in the marketplace since about 1960.

Pictures of a prior art comb profile sealing in the marketplace since 1992.

Cancellation Petition filed by Kempchen Dichtungstechnik GmbH, dated Dec. 4, 2006 regarding Utility Model DE 20 2006 001 224.9.

Cancellation Petition filed by Kempchen Dichtungstechnik GmbH, dated Dec. 7, 2006 regarding Utility Model DE 20 2006 000 726.1.

Letter from von Kreisler Selting Werner to the German Patent and Trademark Office dated Jan. 9, 2007 regarding Utility Model DE 20 2006 001 224.9.

Letter from Dr.rer.nat. Thomas Richter to the German Patent and Trademark Office dated Mar. 16, 2007 regarding Utility Model DE 20 2006 001 224.9.

Letter from Dr.rer.nat. Thomas Richter to the German Patent and Trademark Office dated May 31, 2007 regarding Utility Model DE 20 2006 000 726.1.

Decision from German Patent and Trademark Office to Dr.rer.nat. Thomas Richter dated Jun. 18, 2007 regarding Utility Model DE 20 2006 001 224.9.

Letter from Andrejewski Honke & Sozien to the German Patent and Trademark Office dated Sep. 17, 2007 regarding Utility Model DE 20 2006 000 726.1.

Letter from Dr.rer.nat. Thomas Richter to German Patent and Trademark Office dated Oct. 4, 2007 regarding Utility Model DE 20 2006 000 726.1.

Letter from Dr.rer.nat. Thomas Richter to German Patent and Trademark Office dated Oct. 22, 2007 regarding Utility Model DE 20 2006 000 726.1.

Summons from German Patent and Trademark Office to Dr.rer.nat. Thomas Richter dated Jan. 9, 2008 regarding Utility Model DE 20 2006 001 224.9.

Letter from Dr.rer.nat. Thomas Richter to the German Patent and Trademark Office dated Jan. 14, 2008 regarding Utility Model DE 20 2006 001 224.9.

Letteron on behalf of Kempchen Dichtungstechnik GmbH to the German Patent and Trademark Office dated Jan. 28, 2008 in Utility Model DE 20 2006 001 224.9.

Minutes from German Patent and Trademark Office to Dr.rer.nat. Thomas Richter dated Feb. 7, 2008 regarding Utility Model DE 20 2006 001 224.9.

Action from German Patent and Trademark Office to Dr.rer.nat. Thomas Richter dated Feb. 13, 2008 regarding Utility Model DE 20 2006 000 726.1.

Decision from German Patent and Trademark Office dated Mar. 12, 2008 regarding Utility Model DE 20 2006 001 224.9.

Decision from German Patent and Trademark Office dated Jul. 7, 2008 regarding Utility Model DE 20 2006 000 726.1.

Letter on behalf of Kempchen Dichtungstechnik GmbH in support of appeal to the Federal Patent Court dated Jul. 28, 2008 regarding Utility Model DE 20 2006 001 224.9.

Letter from Dr.rer.nat. Thomas Richter to the Federal Patent Court dated Aug. 4, 2008 regarding Utility Model DE 20 2006 001 224.9.

Letter from Dr.rer.nat. Thomas Richter to the Federal Patent Court dated Sep. 5, 2008 regarding Utility Model DE 20 2006 001 224.9.

Letter on behalf of Kempchen Dichtungstechnik GmbH to the Federal Patent Court dated Mar. 17, 2009 regarding Utility Model DE 20 2006 001 224.9.

Letter from Dr.rer.nat. Thomas Richter to the Federal Patent Court dated Mar. 24, 2009 regarding Utility Model DE 20 2006 001 224.9.

Letter on behalf of Kempchen Dichtungstechnik GmbH to the Federal Patent Court dated Apr. 3, 2009 regarding Utility Model DE 20 2006 001 224.9.

Letter from Dr.rer.nat. Thomas Richter to the Federal Patent Court dated Apr. 3, 2009 regarding Utility Model DE 20 2006 001 224.9.

Letter from Dr.rer.nat. Thomas Richter to the Federal Patent Court dated Apr. 5, 2009 regarding Utility Model DE 20 2006 001 224.9.

Decision from the Federal Patent Court dated Apr. 7, 2009 regarding Utility Model DE 20 2006 001 224.9.

German Examination Report dated Aug. 1, 2013 in German Application No. 10 2006 005 660.4.

* cited by examiner

SEALING ARRANGEMENT

CROSS REFERENCE TO RELATED APPLICATIONS

Applicant claims priority under 35 U.S.C. §119 of German Application No. 20 2006 000 726.1 filed Jan. 17, 2006, German Application No. 20 2006 001 224.9 filed Jan. 26, 2006, German Application No. 10 2006 005 660.4 filed Feb. 8, 2006, and European Application No. PCT/EP2006/065747 filed Aug. 28, 2006. Applicant also claims priority under 35 U.S.C. §365 of PCT/EP2007/050400 filed Jan. 16, 2007. The international application under PCT article 21(2) was not published in English.

The object of the present invention is a sealing arrangement, particularly for flat flange connections, consisting of a ring-shaped, metallic base body and soft material linings present on both sides, preferably of graphite or PTFE or other soft material linings, whereby the base body can have ring teeth that run radially around the circumference on the inside and/or outside, which allow metallic contact, at points, in the installed state, and have a spring characteristic that is selected in such a manner that after the seal is removed from the flanges, the tooth heights can relax back into the state as before installation, and thereby almost the original tooth height is achieved again.

Sealing arrangements of this type stated are described in EP 1062442, and have proven themselves well in practice, in the meantime.

Furthermore, so-called wave ring seals have been known for many years, in which there are soft material linings on both sides of wave-shaped metallic base bodies, whereby these soft material linings are partially pressed into the waves during installation into a flange gap. Because of the required high press-down pressure, the waves of the base body are irreversibly spread apart, and in this connection can be pressed flat, to a great extent. Significant other disadvantages of the wave ring seals are the poor blow-out reliability, the increasing lack of a seal of the flange connection in the case of stress caused by variations in pressure and temperature, and the relatively high installation height of more than 2 mm before installation. This high installation height requires large flange gaps during installation, and often leads to damage of the soft material linings, already during installation. A great disadvantage of the wave rings seals, however, is, in particular, the irreversible radial expansion of the seal when it is pressed down, during which process the wave-shaped base body can be irreversibly stretched flat. Therefore, wave ring seals have not particularly proven themselves in practice, particularly at great stresses and high demands with regard to a lasting seal.

In the case of the sealing arrangements according to EP 1062442, the region covered with the soft material lining is configured to be flat. Thus, no irreversible deformation of the metallic base body takes place in this region. The soft material linings are almost maximally compressed when the flange screws are tightened, and are dimensioned in such a manner that the tips of the ring teeth come into metallic contact with the flange surfaces with a spring characteristic. Thus, the metallic base body and its ring teeth are not irreversibly deformed. These particular features lead to the result that the stresses caused by variations in pressure and temperature are elastically absorbed, and thereby the lasting good seal is obtained.

The invention is based on the task of further improving the lasting seal.

The solution for this task succeeds, according to the invention, by means of the characteristics as described herein.

In the case of a first preferred embodiment of the sealing arrangement according to the invention, by means of which the seal is improved, this arrangement has a ring-shaped metallic base body. The base body has soft material linings applied to it on both sides, whereby the soft material linings are, in particular, linings that have graphite and/or PTFE. Furthermore, the base body has several ring teeth that run radially around the circumference. In the installed state, line-shaped metallic contact occurs between the ring tooth and the sealing surface, at least in the case of one of the ring teeth. According to the invention, the metallic base body has a thickness of less than 0.5 mm, preferably a thickness of less than 0.49 mm, and particularly preferably a thickness of less than 0.3 mm. Surprisingly, it is possible, despite the slight thickness of the metallic base body, to shape the latter and to produce the ring teeth by means of this shaping. Despite the slight material thickness and the flow of the material that occurs during deformation, it is surprising that no crack formations occur, because of the design. According to the invention, the ring teeth have the function, on the one hand, of ensuring a metallic contact at least between one of the ring teeth and the sealing surface. Furthermore, the ring teeth serve to increase the rigidity of the metallic base body. It is only possible to provide such a thin base body, which is particularly produced from a thin sheet metal, because of the provision of ring teeth that run around the circumference, according to the invention.

Preferably, the base body has at least one ring tooth also in the region of the soft material lining. In the case of another preferred embodiment of the invention, the significant aspect consists in the fact that the base body has at least one angle-shaped ring tooth in the region covered by the soft material lining. In this embodiment, it is not absolutely necessary, but preferred, that at least one circumferential ring tooth is provided also in the region that is not covered, which allows a line-shaped metallic contact in the installed state.

According to the invention, the task is accomplished, in the case of a particularly preferred embodiment, in that the region of the base body that is covered by the soft material lining has at least one angle-shaped ring tooth.

In the case of a preferred embodiment, the ring tooth provided in the region of the soft material lining is at least partially plastically deformable, whereby the deformation takes place during installation of the sealing arrangement into a flange connection. The shape of the at least one ring tooth, the thickness of the metallic base body, as well as the metal alloy used, are thus selected, according to the invention, in such a manner that the at least one ring tooth is at least partially plastically deformed, as a function of the forces that occur during installation. In particular, it is preferred, according to the invention, to produce the base body from stainless steel. In this connection, the forces that occur are dependent on the type, the size, and/or the field of use of the flange connection. Because of the plastic deformation of the teeth, which preferably takes place only partially, so that a residual elasticity remains, a pressure peak is produced in the installed state, by means of the tooth tip, in the pressure progression over the cross-section of the seal. The seal is therefore increased in the corresponding line-shaped regions of the tooth tip. This results in an improvement of the seal of the sealing arrangement according to the invention. It is particularly preferred, in this connection, that the plastic deformation of the ring teeth disposed in the region of the sealing liner takes place in such a manner that the teeth have a spring characteristic of 50 to 100%, preferably 75 to 100%. This is understood to mean that the corresponding ring tooth achieves the original height, i.e. the height before its first installation, by 50 to 100%, after the flange connection is removed again. In the case of an original tooth height of 0.5 mm, the tooth has a tooth height of 0.25 to 0.5 mm again after removal.

Preferably, the ring teeth that are not covered with a soft material lining, if such teeth are present, spring back by 75 to 100% after removal.

Preferably, a ring tooth is provided on each side of the metallic base body, in each instance, in the region of the soft material lining. These are ring-shaped teeth, so that a complete seal around the entire flange is assured. The ring teeth disposed on both sides of the metallic base body preferably lie opposite one another, so that the forces generated in the contact lines are directed towards one another, and are not laterally offset from one another.

In the case of another preferred embodiment, which represents an independent invention, the at least one ring tooth is configured, in the region of the soft material lining, in such a manner that the ring tooth essentially springs back into its original state after removal. In this, the resilient nature is therefore characteristic, whereby a slight plastic deformation is acceptable. The significant advantage of such a ring tooth also consists in the fact that a pressure peak is produced in the region of the tooth tip. In this way, the seal of the sealing arrangement is clearly improved. This embodiment preferably has several ring teeth disposed in the region of the soft material lining, whereby preferably, at least one such ring tooth is disposed on each side of the metallic base body.

Thus, according to the invention, these are no longer the conventional wave ring seals, but rather a new type of seal arrangement, which can also be referred to as angle ring seal.

The particularly preferred further developments listed below relate to both independent embodiments.

Preferably, this new sealing arrangement only has a height of less than 2.2 mm, particularly less than 1.7 mm, in the original state before the first installation. Thus, they can be easily installed, without damage to the soft material linings, even at small widths of the flange gaps.

The metallic base bodies, without soft material linings, preferably only have a thickness of less than 1.2 mm, preferably 0.4 to 0.8 mm, measured over the metal tips. The height of the ring teeth can be different in the regions covered with the soft material lining, as well as in the regions not covered with a soft material lining. This depends, for example, on the type of soft material lining used and the field of use of the sealing arrangement. In particular, if the metallic contact of one or more ring teeth that lie on the inside and/or the outside is of essential significance for the seal, these ring teeth can have a greater height than the ring teeth provided in the region of the soft material lining. Preferably, the ring teeth disposed radially outside of the soft material lining, in particular, have a lesser height than the ring teeth covered with the soft material lining. In this way, it is assured that a sufficient surface pressure is guaranteed in the region of the soft material lining. Furthermore, a sufficient compression of the soft material lining is assured in this way. It is particularly preferred that at least one ring tooth disposed outside and/or inside of the soft material lining, in the radial direction, has at least the same height as the soft material lining. The other ring teeth disposed inside and/or outside of the soft material lining then have a lesser height. In this way, a sealing metallic contact is guaranteed. In the case of at least one ring tooth disposed both outside of and within the soft material lining, in particular, having at least the same height, encapsulation of the soft material lining is assured. In this way, both blow-out of the soft material lining and penetration of sealing material into the transported medium are avoided.

The ring teeth that might be disposed radially within and outside of the soft material lining can also have a greater angle than the at least one ring tooth disposed in the region of the soft material lining, in order to change the spring characteristic. If applicable, the ring teeth having a more obtuse angle can additionally have a lesser height.

Of course, however, the base body still has to be thick enough so that it is stable enough to accommodate the compressed soft material lining, and to have a spring characteristic. Preferably, the metallic base bodies therefore consist of a sheet metal, which has a thickness of at least 0.05 mm, but less than 0.49 mm, particularly less than 0.45 mm. Sheet metal thicknesses of approximately 0.1 mm are particularly preferred. The production of the angle-shaped ring teeth therefore preferably takes place from a stainless steel, as corrosion-resistant as possible, which is permanently deformed, using appropriately configured tools, so that almost acute corners are formed on the inside, and slightly rounded edges are formed on the outside.

In this connection, it is certainly possible to produce angle-tooth-shaped base bodies and to use them according to the invention, which bodies have a lesser thickness, measured over the metal tips, in the region covered with the soft material lining, than the exposed ring teeth that might be present. Embodiments with exposed ring teeth also allow the metallic contact with a spring characteristic that is already known from EP 1062442, in the installed state. In the case of these embodiments, as well, the soft material linings are almost maximally compressed.

In order to keep the thickness of the preferred sealing arrangements before their first installation into a flange gap below 2 mm, or actually below 1.7 mm, respectively, graphite linings are preferably used, which, before installation, have a thickness of greater than 0.5 mm at a density of approximately 0.7 or 1.0 kg/m$^3$, and a thickness of 0.25 to 0.5 mm at a density of approximately 1.0 kg/m$^3$. In this connection, attention must be paid to ensure that the soft material linings, in the installed state, are sufficient to fill the interstice between the ring teeth, and are almost maximally compressed both over the tooth tips and over the valleys when this happens. In this connection, compression of the soft material lining takes place, particularly if this is a graphite material lining, by at least 40, preferably at least 45, and particularly preferably at least 50%.

The graphite linings can also be pressed into the ring teeth, on both sides, as early as during production of the angle ring seal, by means of special tools. Then, the graphite linings are still slightly larger than the ring teeth, both in their inside diameter and in their outside diameter.

Attachment is facilitated by means of the overlap of the graphite lining on both sides, and this reduces the risk of injury by means of the thin base body.

Attachment of the soft material linings preferably takes place by means of gluing. However, it can also take place by means of adhesive-free methods.

Preferably, the distance between two ring teeth, in each instance, is less than 4 mm, and can be reduced to a distance of 0.5 mm. The region not covered with the soft material lining can have 1 to 100 ring teeth. In total, the base bodies possess at least 3 and, only in exceptional cases, a total of 140 ring teeth.

Particularly preferred embodiments of the sealing arrangements therefore consist of a base body having a sheet metal with a thickness of 0.1 to 0.49 mm, preferably 0.1 to 0.3 mm, which has points, at intervals of 0.5 to 4 mm, preferably at intervals of 1 to 2.8 mm, particularly preferably 1 to 2 mm, which have a height, measured over the tips, of 0.4 to 0.8 mm, and are covered with soft material linings that possess a thickness of originally 0.25 to 1.0 mm. The thinner the sheet metal used, the smaller the distance between the ring teeth, relative to one another, can be selected to be. The soft material lining can then also be selected to be correspondingly thin. However, the decisive factor is that the soft material lining is optimally compressed after installation, and the spaces between the ring teeth are completely filled with it. In this way, a particularly preferred base body can be used, which, for example, at a sheet metal thickness of less than 0.5 mm, preferably 0.1 to 0.3 mm, a height of less than 1.35 mm, measured over the tips, and a distance between the teeth of less than 3 mm, can be covered with graphite linings that have a thickness of 1 mm at a density of $0.7\ kg/m^3$, and a thickness of 0.5 mm at a density of $1.0\ kg/m^3$. In this connection, again, ring teeth that are not covered can be present on the inside and/or on the outside, which lead to metallic contact in the installed state, and also have a spring characteristic.

These embodiments of the angle ring seals according to the invention lead to a reinforced and improved seal with a lasting spring characteristic, and are superior to all sealing arrangements known until now. This result could not be expected, since it is true that these embodiments stretch flatter when the flange screws are tightened, like the wave ring seals, and thus increase in their dimensions, particularly radially. However, the change in dimensions is reversible in the case of the angle ring seals according to the invention. The spring characteristic therefore leads to a lasting better seal, particularly under greater pressure and temperature stresses. The changes in dimensions in the covered region are reversible, according to the invention, and can actually be absorbed by the exposed ring teeth that are preferably present, and given back in the covered regions.

The ring teeth preferably have rounded tips. In particular, the tips have a radius that is ≥1 mm, preferably ≥0.75 mm, and particularly preferably ≥0.5 mm. Preferably, the inner region of the ring teeth, i.e. the region that lies opposite the rounded tip, is also rounded off. The rounding preferably has a radius ≥0.75 mm, particularly ≥0.5 mm, and particularly preferably ≥0.25 mm.

By means of the rounding of the tips in the outer and/or in the inner region, a tear of the base body, particularly if it is made from a thin sheet metal, can be avoided during deformation of the base body to produce the ring teeth.

In the case of a particularly preferred further development, the innermost of the ring teeth, i.e. the ring tooth with the smallest diameter, is preferably configured in such a manner that the flank that points inward, i.e. the inner free end of the seal, has a length, with reference to the other flank of the ring tooth, of at least 40% of this flank. Preferably, this flank has an angle, with reference to the longitudinal direction of the flange, or with reference to a perpendicular to the sealing plane, respectively, of 30 to 70°, particularly approximately 45°. In this way, a tight contact of the ring teeth on the flange is guaranteed. The tooth tip is pressed against the flange by means of the length of the inside flank, because of the medium pressure of the medium flowing through the flange. In this way, the seal is further improved.

At a sealing width for ANSI B 16.5 flanges, the graphite lining preferably has a width, as a function of the pipe diameter on each side, which is less than:

19 mm per side at 1 inch,
16 mm per side at 2 inches,
19 mm per side at 3 inches,
21 mm per side at 4 inches,
24 mm per side at 6 inches,
25 mm per side at 8 and 10 inches,
28 mm per side at 12 and 14 inches,
32 mm per side at 16 inches,
39 mm per side at 18 and 24 inches.

Furthermore, it is preferred that the sealing lining, also for DIN flanges, is at DN 25, less than 11 mm,
at DN 40 and 50, less than 13 mm,
at DN 80, less than 15 mm,
at DN 100/150, less than 17 mm,
at DN 200 to DN 300, less than 19 mm,
at DN 400 to DN 500, less than 26 mm,
at DN 600, less than 27 mm, in order to achieve a greater surface pressure with embossed seals in the case of smaller graphite strips, at the same tightening torques of the screws, which are provided by the screw manufacturer, so that a better seal is achieved.

Preferred embodiments of the angle ring seals according to the invention are explained in greater detail in the following schematic figures.

In these figures, the reference symbols refer, in each instance, to

1 the metallic base body
2 soft material linings
3 exposed ring teeth
4 exposed ring teeth
5 ring teeth covered with soft material linings
6 parts of a flange
7 parts of a flange screw
8 pointed corners
9 round edges
10 flank lying on the inside
11 flank lying on the outside
12 centering ring
L flank length
L' flank length The preferred embodiments of the invention shown in the figures are simplified representations. In this connection, circumferential visual edges of the rotation-symmetrical seal are not shown, or are only indicated, respectively, in order to guarantee a good overview. In all of the figures, the inside of the flange connection, i.e. the inside of the sealing arrangement, is always on the left side. In all of the drawings, the medium-transporting pipe therefore lies on the left side. Installation of the seals into a flange is shown in FIGS. 11 and 12.

Figure 1:
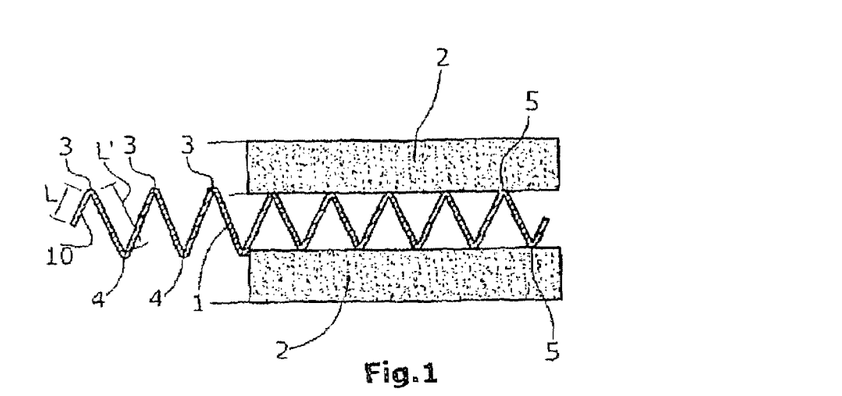

FIG. 1 shows an embodiment in which several ring teeth 3, 4 are not covered, towards the inside, by the soft material lining. These exposed ring teeth are larger, measured over the tooth tips, than the covered ring teeth 5, and lead to a metallic seal with spring characteristic. The ring tooth 3 lying on the inside has a free flank 10 that has a length L. The length L is less than the length L', of the corresponding other flank of the inner ring tooth 3, which lies on the outside. In particular, the flank 10 has a length L of 40 to 60% of the flank length L' that lies on the outside. In this way, it is guaranteed that the tip of the ring tooth 3 that lies on the inside has a metallic contact with the flange. The flank 10 has the corresponding angle of the other flanks, so that the ring tooth 3 that lies on the inside essentially has the same angle as the other ring teeth 3.

Figure 2:
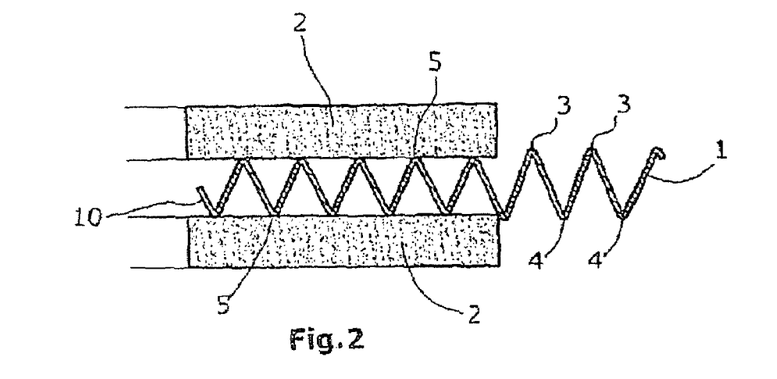
Figure 11:
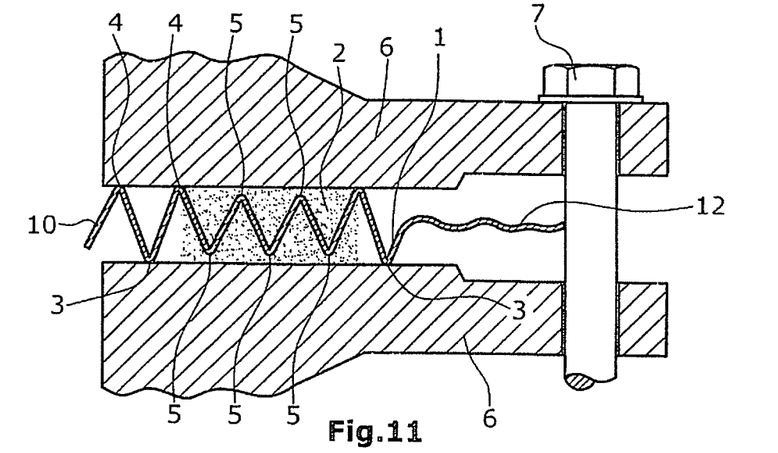
Figure 12:
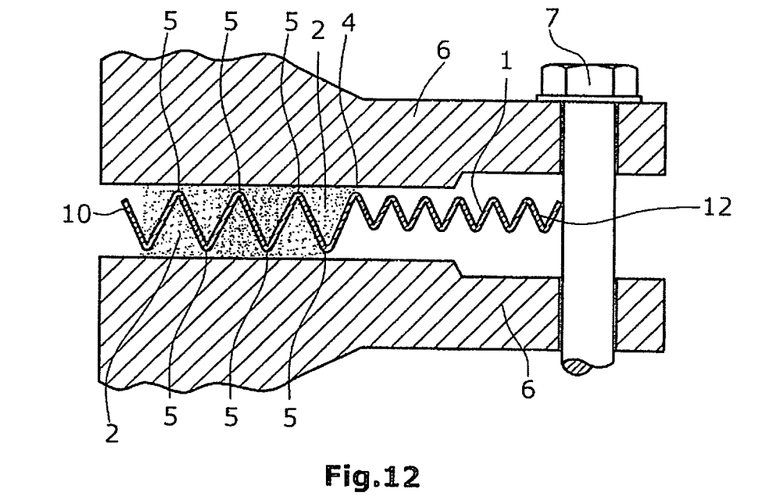

FIG. 2 shows an equivalent embodiment, in which the exposed, larger ring teeth 3, 4 are not on the inside, towards the medium, but rather in the region that lies on the outside, and can make contact on the flange screws 7 (FIG. 11, 12).

Figure 3:
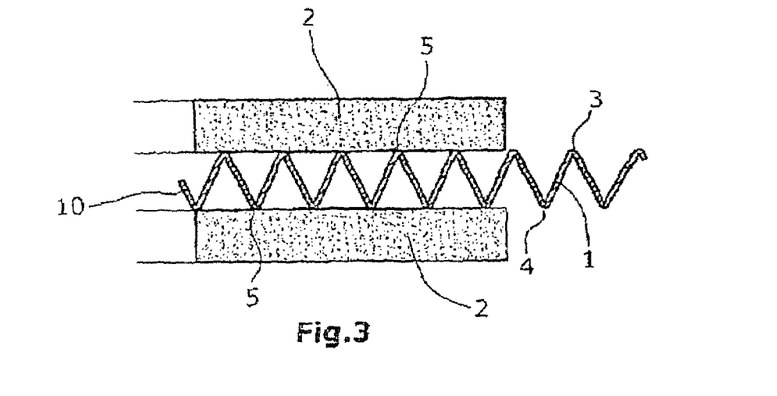

FIG. 3 shows an embodiment similar to FIG. 2, but all of the free and covered ring teeth 3, 4, 5, measured over the tooth tips, have the same height, and the graphite 2 seals on the inside. However, the soft material lining 2 can also extend over the outer ring teeth 3, 4.

Figure 4:
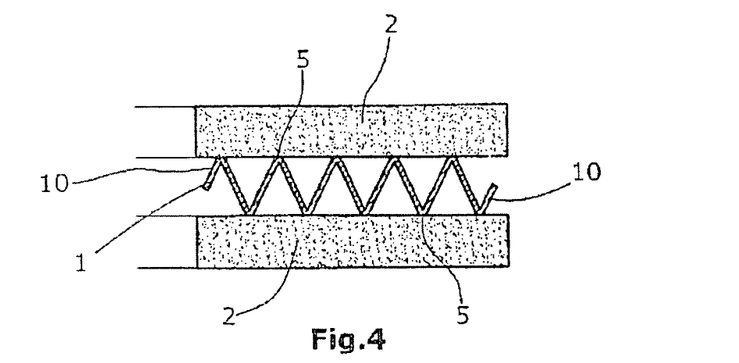

FIG. 4 shows an angle ring seal in which all of the ring teeth 5 have the same height and are completely covered by the soft material lining 2.

Figure 5:
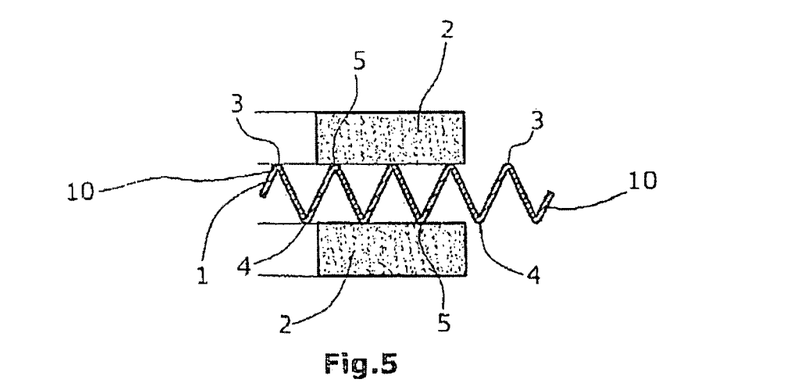

FIG. 5 shows an angle ring seal in which exposed ring teeth 3, 4 are present on the inside and on the outside, and only the center region is covered with the soft material lining 2.

Figure 6:
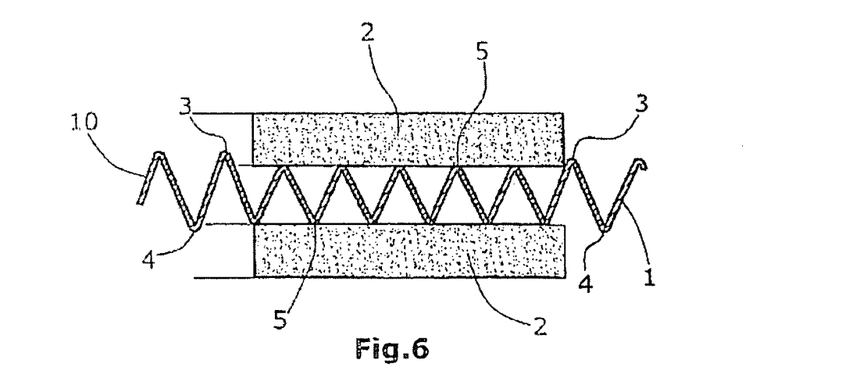

FIG. 6 shows an embodiment similar to FIG. 5, but the covered ring teeth 5, measured over their tips, have a slightly lesser thickness than the exposed ring teeth 3, 4 in the inner and outer region.

Figure 7:
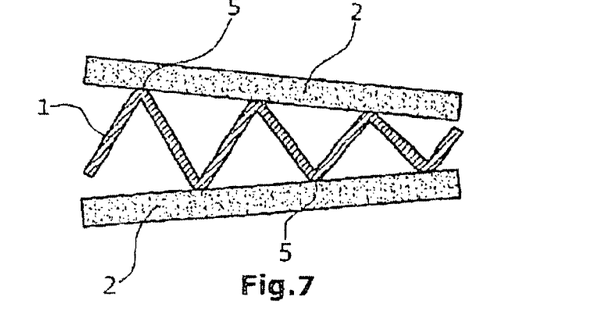

FIG. 7 shows an embodiment of the angle ring seal in which the thickness of the ring teeth 5, measured over their tips, increases conically, measured from the outside to the inside.

Figure 8:
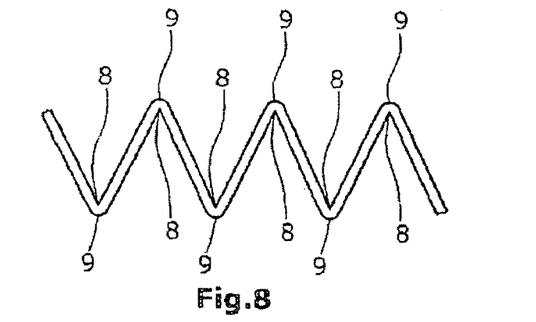

FIG. 8 shows a preferred embodiment of the metallic base body 1, with acute angles and slightly rounded edges 9, i.e. tooth tips.

Figure 9:
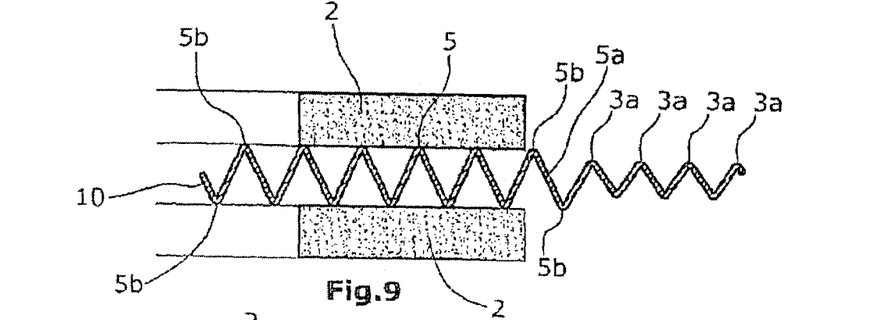

FIG. 9 shows another preferred embodiment of the sealing arrangement according to the invention, in which the centering ring teeth 3a that lie on the outside have a lesser height, over their tips, than the ring teeth disposed in the region of the soft material lining 2. Furthermore, a ring tooth 5a that is directly adjacent to the soft material lining, but is not covered by the soft material lining 2, has the same height as the ring teeth 5 covered by the soft material lining 2. In this way, a line-shaped metallic contact between the tips 5b and the flange is assured.

In addition to or instead of providing a ring tooth 5a having the same height, as well as lower centering ring teeth 3a on the outside of the soft material lining 2, such teeth 5b can also be provided on the inside.

Figure 10:
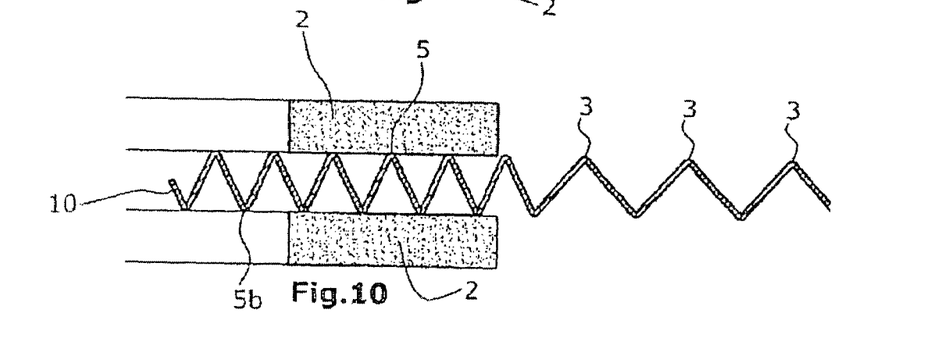

FIG. 10 shows another preferred embodiment of the invention, in which it is true that the ring teeth 3, 4 that lie on the outside have the same height as the ring teeth 5 covered with the soft material lining 2, but the angle of the ring teeth 3 is more obtuse than the angle of the ring teeth 5. If applicable, such ring teeth configured in flat manner are also additionally disposed on the inside of the base body 1, or exclusively on the inside of the base body 1.

Furthermore, a combination of the sealing arrangements shown in FIGS. 9 and 10 is possible. For example, flatter and also lower ring teeth can be disposed on the outside. Also, flatter and, at the same time, lower ring teeth can be provided on the inside and/or outside of the soft material lining 2.

FIG. 11 shows a preferred angle ring seal having a narrow sealing width, in the installed state, in which, as in FIGS. 5 and 6, higher ring teeth 3, 4, which are not covered, are present on the outside and inside, which teeth bring about a metallic seal with a spring characteristic, and in the center, the ring teeth 5 covered with the soft material lining 2 are slightly lower, whereby the soft material linings 2 are optimally compressed both over the tips and in the valleys that lie between them, and, in this connection, have an additional spring characteristic. Furthermore, a centering ring 12 is provided, which is slightly waved in cross-section. In this way, the stability of the centering ring can be improved. Thus, it is possible to provide wider centering rings that do not have any distortions.

FIG. 12 shows an embodiment, in the installed state, having a narrow sealing width as in FIG. 4, in which all of the ring teeth 5, measured over their tips, originally have the same thickness and are completely covered with soft material linings 2. Because of the optimal compression of the soft material linings 2, both over the tips and in the valleys that lie between them, these seals have a spring characteristic. Furthermore, a centering ring 12 is also provided. The centering ring 12 is wave-shaped corresponding to the centering ring shown in FIG. 11 or has an angle-shaped or pointed cross-section. The waves or angles or points of the centering ring have a height that is less than the height of the ring teeth 3, 4, or 5, in order to thereby achieve a greater surface pressure. By means of the angle-shaped configuration of the centering ring, the stability can be further improved. As a result, the centering ring can be configured to be wider. For example, it is possible to implement a centering ring width of more than 20 mm at a sheet metal thickness of approximately 0.1 mm, particularly more than 30 mm, and possibly even more than 50 mm, without any distortions occurring.

Figure 13:
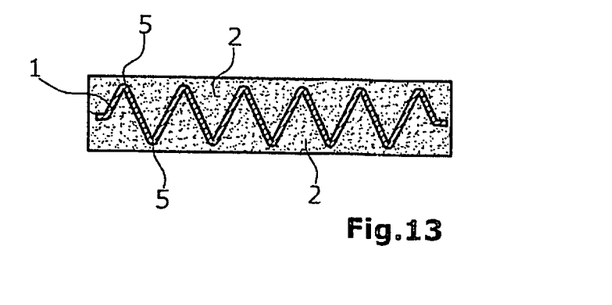

FIG. 13 shows an angle ring seal consisting of the base body 1 and soft material linings 2, which are already pressed into the ring teeth 5 before installation, and project slightly beyond the outermost ring teeth, in each instance. In the case of this embodiment, the risk of injury caused by the sharp sheet metal edges during installation is reduced, particularly if the soft material linings are glued to one another in this region. These embodiments are furthermore characterized by increased rigidity.

In the figures, the ring teeth 3, 4, 5 are shown with relatively acute angles below 900. However, the angle ring seals according to the invention can also have ring teeth with more obtuse angles, particularly also approximately right angles. It is particularly important that they have a spring characteristic. In this connection, in a preferred embodiment, the shape is adapted to the spring characteristic of the ring teeth 5 covered with soft material lining. By means of the material selection and material thickness of the covered ring teeth 5, in particular, the result can be achieved that these are partially plastically deformed during installation. Because of the elasticity that remains despite the plastic deformation, an increased pressure is exerted on the soft material lining 2 in this region, by the peaks of the covered ring teeth 5, and thus the seal is increased.

The invention claimed is:

1. A sealing arrangement for a flat flange connection, the sealing arrangement having a ring-shaped, metallic base body and soft material linings present on both sides, wherein in a state before installation of the sealing arrangement into a flange
    a covered region of the base body is completely covered by the soft material linings and has angle-shaped ring teeth, the angle-shaped ring teeth being at least partially plastically deformable, each angle-shaped ring tooth of the angle-shaped ring teeth having a respective covered metal tip and a respective covered height,
    the sealing arrangement has a centering ring with exposed ring teeth, each exposed ring tooth of the exposed ring teeth having a respective exposed metal tip and a respective exposed height,
    each angle-shaped ring tooth has a respective covered acute angle, each exposed ring tooth has a respective exposed acute angle, each covered acute angle is more acute than each exposed acute angle, and
    each covered height is greater than or equal to each exposed height.

2. The sealing arrangement according to claim 1, wherein the angle-shaped ring teeth and the exposed ring teeth run radially around the circumference, on at least one of an inside portion of the base body and an outside portion of the base body, and have a spring characteristic that is selected in such a manner that after the sealing arrangement is removed from flanges, each covered height and each exposed height can relax back to achieve again almost an original covered height and an original exposed height, respectively.

3. The sealing arrangement according to claim 1, wherein an angle-shaped ring tooth of the angle-shaped ring teeth generates a pressure peak to increase sealing forces provided by the sealing arrangement and/or has a spring characteristic such that after the sealing arrangement is removed from flanges, the angle-shaped ring tooth has 50 to 90% of an original tooth height.

4. The sealing arrangement according to claim 1, wherein the metallic base body has a tip-to-tip thickness of less than 1.2 mm.

5. The sealing arrangement according to claim 1, wherein the metallic base body comprises a sheet metal having a thickness of at least 0.05 mm, but less than 0.49 mm.

6. The sealing arrangement according to claim 1, wherein the exposed metal tips are rounded.

7. The sealing arrangement according to claim 1, wherein the exposed metal tips are rounded and have a respective radius greater than or equal to 0.5 mm.

8. The sealing arrangement according to claim 1, wherein the angle-shaped ring teeth and the exposed ring teeth have respective rounded inner regions lying opposite the covered metal tips and the exposed metal tips, respectively, whereby the rounded inner regions have a radius greater than or equal to 0.25 mm, respectively.

9. The sealing arrangement according to claim 1, wherein the soft material linings project beyond an edge of the metallic base body on an inside portion of the base body, and are glued or pressed to one another there.

10. The sealing arrangement according to claim 1, wherein the base body has at least 3 and at most 100 ring teeth, and a region of the base body not covered with the soft material linings has 1 to 60 ring teeth.

11. The sealing arrangement according to claim 1, wherein the angle-shaped ring teeth and the exposed ring teeth have a shape of a comb profile seal, but are not produced by shaping by cutting, but rather are produced by deformation.

12. The sealing arrangement according to claim 1, wherein the soft material linings are coordinated with one another and calculated, as a function of the covered heights and the exposed heights, in such a manner that an optimal compression takes place both in valleys of the base body and over the covered metal tips.

13. The sealing arrangement according to claim 1, wherein the sealing arrangement runs conically from an outside portion of the base body to an inside portion of the base body, and the outside portion is smaller in height than the inside portion towards a medium portion of the base body.

14. The sealing arrangement according to claim 1, wherein the centering ring is on an outside portion of the base body, has an outer edge, is wider than 4 mm on the outer edge, and is produced by deformation.

15. The sealing arrangement according to claim 1, wherein the soft material linings are encapsulated within flanges by metallic contact of inner and outer teeth of the angle-shaped ring teeth and the exposed ring teeth with the flanges, and thus a three-way seal per flange side takes place, each three-way seal comprising a metallic inner seal, a soft material seal, and a metallic outer seal.

16. The sealing arrangement according to claim 1, wherein the sealing arrangement has a two-way seal per flange side, each two-way seal comprising a metallic seal on an inside portion of the sealing arrangement and a soft material seal on an outside portion of the sealing arrangement.

17. The sealing arrangement according to claim 1, wherein the sealing arrangement has a two-way seal per flange side, each two-way seal comprising a soft material seal on an inside portion of the sealing arrangement and a metallic seal on an outside portion of the sealing arrangement.

18. The sealing arrangement according to claim 1, wherein an end of the base body faces inward and is configured as an end ring tooth, whereby an inner flank of the end ring tooth has a flank length of at least 40 to 60% of a flank length of an adjacent flank of the ring tooth or another ring tooth lying farther in an outside direction.

19. The sealing arrangement according to claim 1, wherein the soft material lining has a width on each side as a function of a pipe diameter, the width being less than 19 mm per side at a 1 inch pipe diameter;
less than 16 mm per side at a 2 inch pipe diameter;
less than 19 mm per side at a 3 inch pipe diameter;
less than 21 mm per side at a 4 inch pipe diameter;
less than 24 mm per side at a 6 inch pipe diameter;
less than 25 mm per side at 8 and 10 inch pipe diameters;
less than 28 mm per side at 12 and 14 inch pipe diameters;
less than 32 mm per side at a 16 inch pipe diameter; and
less than 39 mm per side at 18 and 24 inch pipe diameters.

20. The sealing arrangement according to claim 1, wherein the soft material-linings have a width on each side, as a function of a pipe diameter, such that:
when the pipe diameter is 25 mm, the width is less than 11 mm;
when the pipe diameter is between 40 mm and 50 mm, the width is less than 13 mm;
when the pipe diameter is 80 mm, the width is less than 15 mm;
when the pipe diameter is between 100 mm and 150 mm, the width is less than 17 mm;
when the pipe diameter is between 200 mm and 300 mm, the width is less than 19 mm;
when the pipe diameter is between 400 mm and 500 mm, the width is less than 26 mm; and
when the pipe diameter is 600 mm, the width is less than 27 mm.

21. The sealing arrangement according to claim 1, wherein a tip-to-tip thickness of the base body is less than 1.35 mm, and
wherein the angle-shaped ring teeth and exposed ring teeth have a distance between two adjacent ring teeth, in each instance, of less than 3 mm.

22. The sealing arrangement according to claim 1, wherein a tip-to-tip thickness of the base body is less than 1.2 mm, and
wherein the angle-shaped ring teeth and exposed ring teeth have a distance between two adjacent ring teeth, in each instance, of less than 4 mm.

23. The sealing arrangement according to claim 1, wherein the metallic base body has a sheet metal thickness of less than 0.49 mm,
a tip-to-tip thickness of the base body is less than 1.35 mm, and
the angle-shaped ring teeth and exposed ring teeth have a distance between two adjacent ring teeth, in each instance, of less than 3 mm, and
the sealing arrangement has a total thickness of less than 2.2 mm, the total thickness being based on the tip-to-tip thickness of the base body and lining thicknesses of the soft material linings on both sides of the base body, respectively.

24. The sealing arrangement according to claim 1, wherein the metallic base body has a sheet metal thickness of less than 0.49 mm,
a tip-to-tip thickness of the base body is less than 1.2 mm, and the angle-shaped ring teeth and the exposed ring teeth have a distance between two adjacent ring teeth, in each instance, of less than 4 mm, and the sealing arrangement has a total thickness of less than 2.2 mm, the total thickness being based on the tip-to-tip thickness of the base body and lining thicknesses of the soft material linings on both sides of the base body, respectively.

25. The sealing arrangement according to claim 24, wherein the sheet metal thickness is less than 0.3 mm.

26. The sealing arrangement according to claim 1, wherein a distance between the angle-shaped ring teeth is less than 3 mm.

27. The sealing arrangement according to claim 1, wherein the soft material linings are made of graphite or polytetrafluoroethylene (PTFE).

28. A sealing arrangement for a flat flange connection, the sealing arrangement having a ring-shaped, metallic base body and soft material linings present on both sides, whereby the base body has a circumference and several ring teeth that run radially around the circumference, the ring teeth having respective tips, wherein in a state before installation of the sealing arrangement into a flange as well as in an operational state of the sealing arrangement in the flange the metallic base body has a sheet metal thickness of less than 0.49 mm, the base body has covered ring teeth of the ring teeth, the covered ring teeth being completely covered with the soft material linings, a tip-to-tip thickness of the base body is less than 1.2 mm, and the ring teeth have a distance between two adjacent ring teeth, in each instance, of less than 3 mm, and the sealing arrangement has a total thickness of less than 2.2 mm, the total thickness being based on the tip-to-tip thickness of the base body and lining thicknesses of the soft material linings on both sides of the base body, respectively.

29. The sealing arrangement according to claim 28, wherein a covered ring tooth of the covered ring teeth generates a pressure peak to increase sealing forces provided by the sealing arrangement and/or has a spring characteristic such that after the sealing arrangement is removed from flanges, a respective covered height of the covered ring tooth is 50 to 90% of an original tooth height.

30. The sealing arrangement according to claim 28, wherein the covered ring teeth have covered tips, respectively, and covered heights, respectively, wherein the ring teeth include exposed ring teeth having exposed tips, respectively, and exposed heights, respectively and wherein each covered height is less than each exposed height.

31. The sealing arrangement according to claim 28, wherein the sheet metal thickness is at least 0.05 mm.

32. The sealing arrangement according to claim 28, wherein the ring teeth have respective acute angles and the tips are rounded.

33. The sealing arrangement according to claim 28, wherein the radial tips are rounded and have a respective radius greater than or equal to 0.5 mm.

34. The sealing arrangement according to claim 28, wherein the ring teeth have respective rounded inner regions lying opposite the tips, whereby the rounded inner regions have a radius greater than or equal to 0.25 mm, respectively.

35. The sealing arrangement according to claim 28, wherein the soft material linings project beyond an edge of the metallic base body on at least one of an inside portion of the base body and an outside portion of the base body, and are glued or pressed to one another there.

36. The sealing arrangement according to claim 28, wherein the base body has at least 3 and at most 100 ring teeth, and a region of the base body not covered with the soft material linings has 1 to 60 ring teeth.

37. The sealing arrangement according to claim 28, wherein the ring teeth have a shape of a comb profile seal, but are not produced by shaping by cutting, but rather are produced by deformation.

38. The sealing arrangement according to claim 28, wherein the soft material linings are coordinated with one another and calculated, as a function of tooth heights of the ring teeth, in such a manner that an optimal compression takes place both in valleys of the base body and over the tips of the ring teeth.

39. The sealing arrangement according to claim 28, wherein the sealing arrangement runs conically from an outside portion of the base body to an inside portion of the base body, and the outside portion is smaller in height than the inside portion towards a medium portion of the base body.

40. The sealing arrangement according to claim 28, wherein the sealing arrangement has a centering ring on an outside portion of the base body, the centering ring having an outer edge, being wider than 4 mm on the outer edge, and being produced by deformation.

41. The sealing arrangement according to claim 28, wherein the soft material linings are encapsulated within flanges by metallic contact of inner and outer teeth of the several ring teeth with the flanges, and thus a three-way seal per flange side takes place, each three-way seal comprising a metallic inner seal, a soft material seal, and a metallic outer seal.

42. The sealing arrangement according to claim 28, wherein the sealing arrangement has a two-way seal per flange side, each two-way seal comprising a metallic seal on an inside portion of the sealing arrangement and a soft material seal on an outside portion of the sealing arrangement.

43. The sealing arrangement according to claim 28, wherein the sealing arrangement has a two-way seal per flange side, each two-way seal comprising a soft material seal on an inside portion of the sealing arrangement and a metallic seal on an outside portion of the sealing arrangement.

44. The sealing arrangement according to claim 28, wherein an end of the base body faces inward and is configured as an end ring tooth, whereby an inner flank of the end ring tooth has a flank length of at least 40 to 60% of a flank length of an adjacent flank of the ring tooth or another ring tooth lying farther in an outside direction.

45. The sealing arrangement according to claim 28, wherein the base body has a centering ring, wherein the covered ring teeth have respective covered tips and respective covered heights, wherein the ring teeth include exposed centering ring teeth having respective exposed tips and respective exposed heights, and wherein each covered height is greater than each exposed height.

46. The sealing arrangement according to claim 28, wherein the covered ring teeth have a respective covered acute angle, wherein the base body has a centering ring, wherein exposed centering ring teeth of the several ring teeth have respective exposed acute angles, and wherein each covered acute angle is more acute than each exposed acute angle.

47. The sealing arrangement according to claim 28, wherein the soft material lining has a width on each side as a function of a pipe diameter, the width being less than 19 mm per side at a 1 inch pipe diameter;

less than 16 mm per side at a 2 inch pipe diameter;
    less than 19 mm per side at a 3 inch pipe diameter;
    less than 21 mm per side at a 4 inch pipe diameter;
    less than 24 mm per side at a 6 inch pipe diameter;
    less than 25 mm per side at 8 and 10 inch pipe diameters;
    less than 28 mm per side at 12 and 14 inch pine diameters;
    less than 32 mm per side at a 16 inch pipe diameter; and
    less than 39 mm per side at 18 and 24 inch pipe diameters.

48. The sealing arrangement according to claim 28, wherein the soft material-linings have a width on each side, as a function of a pipe diameter, such that:

when the pipe diameter is 25 mm, the width is less than 11 mm;
    when the pipe diameter is between 40 mm and 50 mm, the width is less than 13 mm;
    when the pipe diameter is 80 mm, the width is less than 15 mm;
    when the pipe diameter is between 100 mm and 150 mm, the width is less than 17 mm;
    when the pipe diameter is between 200 mm and 300 mm, the width is less than 19 mm;
    when the pipe diameter is between 400 mm and 500 mm, the width is less than 26 mm; and
    when the pipe diameter is 600 mm, the width is less than 27 mm.

49. The sealing arrangement according to claim 28, wherein the soft material linings are made of graphite or polytetrafluoroethylene (PTFE).

50. The sealing arrangement according to claim 28, wherein the sheet metal thickness is less than 0.3 mm.

\* \* \* \* \*

UNITED STATES PATENT AND TRADEMARK OFFICE
CERTIFICATE OF CORRECTION

PATENT NO. : 8,672,330 B2
APPLICATION NO. : 11/922834
DATED : March 18, 2014
INVENTOR(S) : Jung It is certified that error appears in the above-identified patent and that said Letters Patent is hereby corrected as shown below:

In the Specification:

Column 8, line 24, after the word "below," please change "900" to correctly read: --90°--.

In the Claims:

In Column 9, line 52, (Line 3 of Claim 14) after the word "the," please change "cuter" to correctly read: --outer--.

In Column 13, line 10, (Line 10 of Claim 47) after the word "inch," please change "pine" to correctly read: --pipe--.

Signed and Sealed this
Tenth Day of June, 2014

Michelle K. Lee
*Deputy Director of the United States Patent and Trademark Office*